United States Patent [19]

Walk

[11] Patent Number: 5,092,412
[45] Date of Patent: Mar. 3, 1992

[54] EARTH BORING BIT WITH RECESSED ROLLER BEARING

[75] Inventor: Howard J. Walk, Arlington, Tex.

[73] Assignee: Baker Hughes Incorporated, Houston, Tex.

[21] Appl. No.: 620,238

[22] Filed: Nov. 29, 1990

[51] Int. Cl.⁵ ............................................. F16C 19/00
[52] U.S. Cl. ..................................... 175/372; 384/96
[58] Field of Search .............................. 384/96, 95, 92; 175/371, 372

[56] References Cited

U.S. PATENT DOCUMENTS

| | | | |
|---|---|---|---|
| 2,076,003 | 4/1937 | Reed | 384/96 |
| 2,111,732 | 3/1938 | Reed | 384/96 |
| 2,823,083 | 2/1958 | Welton et al. | 384/96 |
| 4,395,076 | 7/1983 | Sabre | 384/92 |

Primary Examiner—William P. Neuder
Attorney, Agent, or Firm—Gerald W. Spinks

[57] ABSTRACT

A roller cutter earth boring bit having longer roller bearings recessed into surrounding bit structure for increased load carrying capacity. The elimination of thrust bearing shoulders from the bearing pin structure between sets of roller bearings enables the use of such longer roller bearings.

5 Claims, 2 Drawing Sheets

FIG. 1
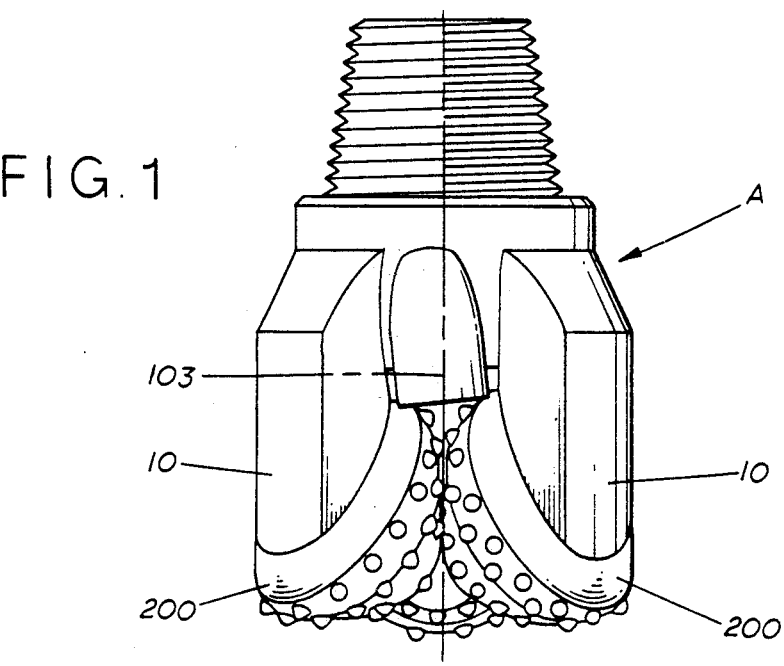
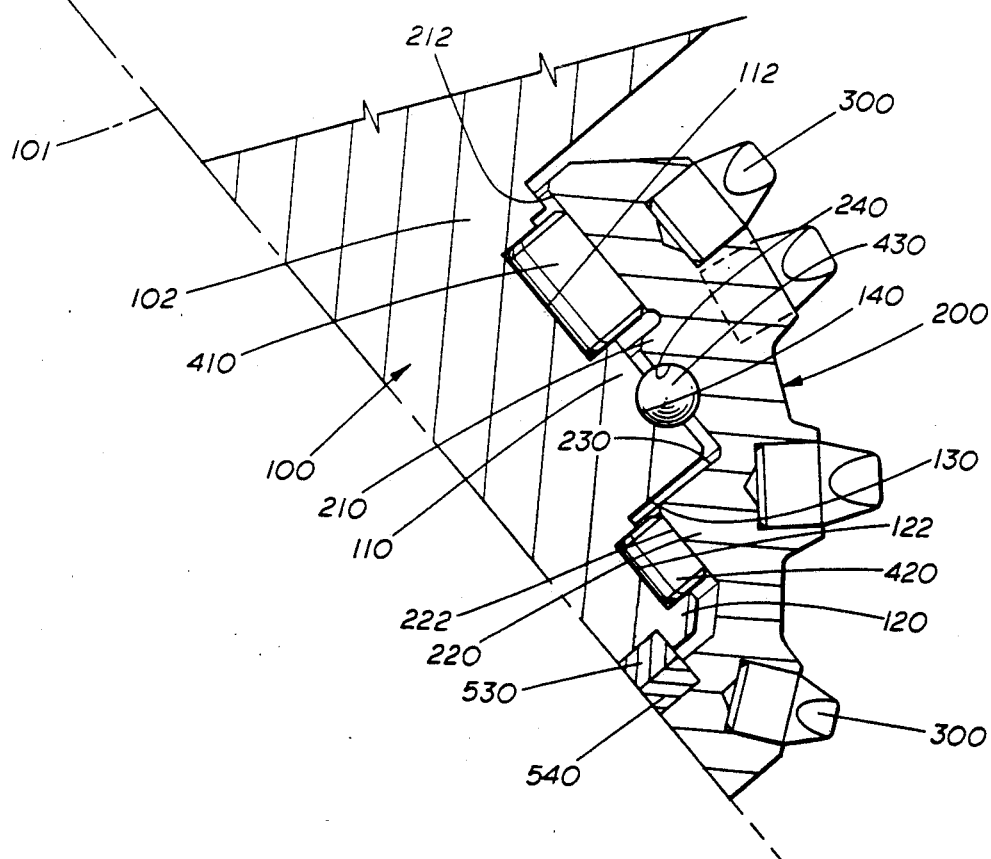
FIG. 2 (PRIOR ART)

EARTH BORING BIT WITH RECESSED ROLLER BEARING

FIELD OF THE INVENTION

This invention is in the field of earth boring bits used in mining or well drilling applications.

BACKGROUND OF THE INVENTION

In the typical tri-cone roller cutter bit, the cutter elements are mounted on the outer surface of three hollow, cone-shaped cutters. Each of these three cone-shaped cutters is mounted on a respective cylindrical bearing pin which in turn extends down from the lower end of a lug. The three lugs are welded together to make a complete bit.

The three bearing pins extend down from their respective lugs toward the longitudinal axis of the bit, with the axis of each bearing pin sloping downwardly at a selected angle as shown in FIG. 1 in the general direction of the axis of the bit. Each bearing pin typically has two bearing journals, one formed on an outermost or upper cylindrical section of larger diameter, and the other formed on an innermost or lower cylindrical section of smaller diameter. Each of these journals can have a bearing race upon which a plurality of roller bearings ride. These bearings provide lateral support between the bearing pin and the cone-shaped cutter. Axial support is provided by thrust-absorbing means such as a tungsten carbide thrust button which is typically mounted on the lower end of the bearing pin and such as thrust bearing shoulders between the two bearing journals. The cutter is typically held on the bearing pin by a series of ball bearings riding in a race located generally between the two sets of roller bearings. The balls are inserted into the race after assembly of the cutter on the bearing pin.

The ability to withstand lateral loads on the bearing pins is to some extent dependent upon the load-carrying capacity of the two sets of roller bearings. In general, the greater the length of each individual roller, the greater the load-carrying capacity of the roller bearing. The limit of the combined lengths of the two sets of roller bearings is determined by the available length of bearing races, which depends upon the overall length of the bearing pin, allowing for the length required by the ball bearings and the length required by the thrust absorbing means. As the weight on the bit increases, the required load-carrying capacity of the roller bearings increases. Therefore, the length of the roller bearings can be a limiting factor on the allowable weight on bit. Inadequate roller length can cause reduced load-carrying capacity, resulting in reduced bearing life and reduced bit life. It would be desirable to increase the allowable roller bearing length for a given size of cutter, thereby increasing the load-carrying capacity of the bearings.

SUMMARY OF THE INVENTION

This invention includes a modification to the structure of the bearing pin which results in a longer bearing race and allows the use of longer roller bearings for a given size of cutter. The modification is the provision of an undercut portion at the end of one of the upper and larger bearing journals, allowing the race on the lower and smaller adjacent journal to have a greater length by extending up into the bearing pin structure, enabling the use of longer bearing rollers. The undercut portion is typically an annular recess machined into the shoulder formed between the two bearing journals, usually extending behind the ball bearing race in the outermost cylindrical section of the bearing pin.

In another aspect, this invention includes the use of a single thrust button at the end of the bearing pin to withstand axial thrust on the cutter and bearing pin. A single thrust button is used in lieu of the usual combination of one button at the end of the bearing pin and a pair of thrust bearing shoulders between the bearing journals. Elimination of the thrust bearing shoulders facilitates the forming of the aforementioned undercut portion in the shoulder of the pin.

BRIEF DESCRIPTION OF THE DRAWINGS

FIG. 1 is an elevation view of a roller cutter bit.

FIG. 2 is a sectional view of a portion of a bearing pin and a cone-shaped cutter as known in the prior art.

DETAILED DESCRIPTION OF THE PREFERRED EMBODIMENT

Figure 3:
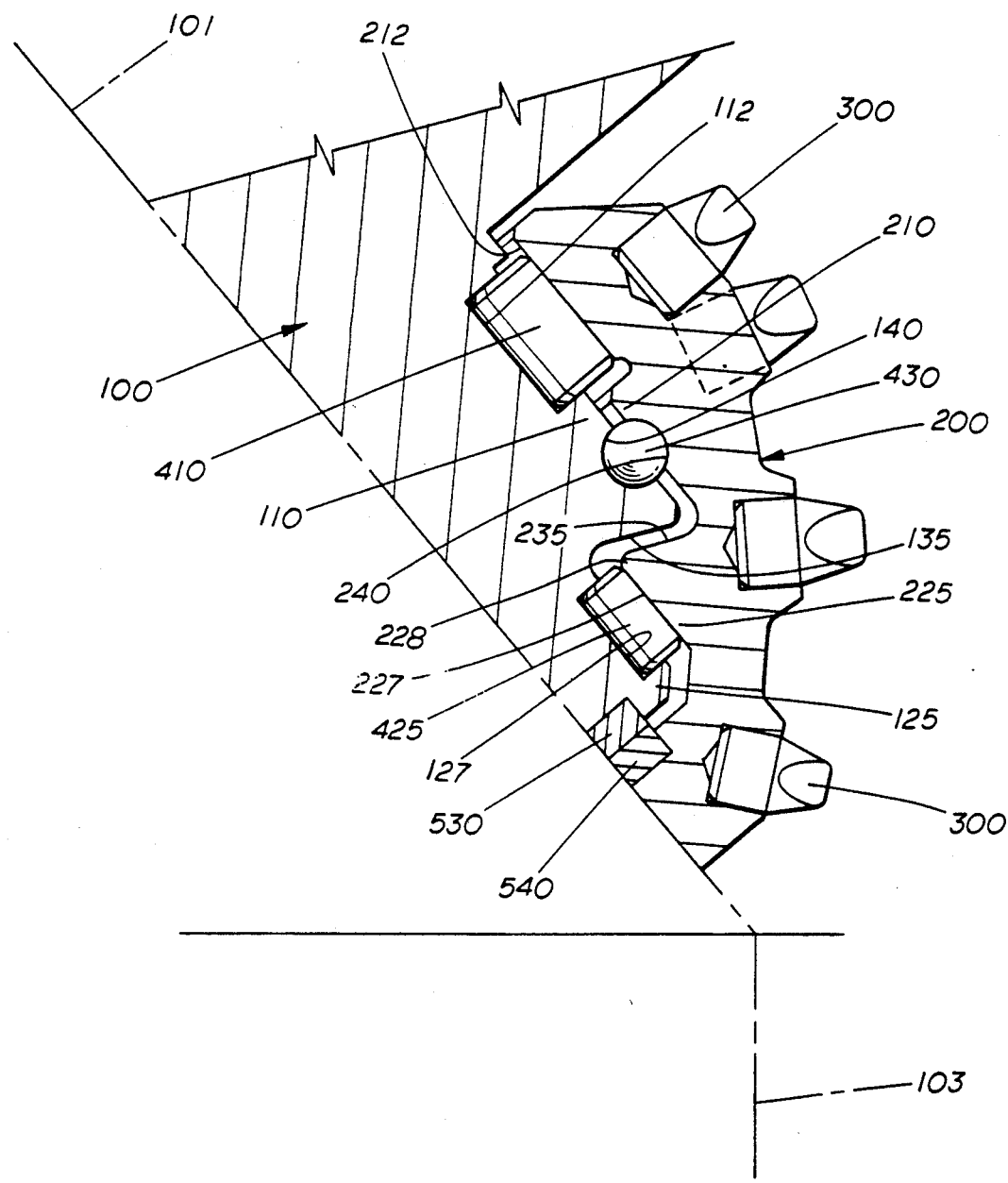
FIG. 3 is a sectional view of a portion of a bearing pin and a cone-shaped cutter of the present invention.

As seen in FIG. 1 and 2, in the prior art, bearing pin 100 attaches to, and extends at a downward angle from, a lug 10 of the drill bit A. The axis or centerline 101 of bearing pin 100 slopes downwardly in the general direction of the axis 103 of the drill bit. Bearing pin 100 is composed typically of two cylindrical journals or sections. Outermost or upper section 110 is of larger diameter than innermost or lower section 120. The terms outer and inner refer to positions relative to the centerline 103 of the drill bit.

Outer section 110 attaches at its outermost end 102 to the drill bit lug 10. Inner section 120 extends from the innermost end of outer section 110 toward the drill bit axis. Inner section 120 and outer section 110 have a common axis 101.

Cone shaped cutter 200 is rotatably mounted upon bearing pin 100. The inner cavity or bore of cutter 200 typically has outer diameter 210 and inner diameter 220 which generally conform to outer journal or section 110 and inner journal or section 120 of bearing pin 100. Cutter elements 300, which fracture and break the earth formation being drilled, are press fit in the outside surface of cutter 200. Alternatively, the bit may be of the milled tooth type, in which the cutting elements are integrally formed with the roller cutter body by machining away portions of the body between adjacent teeth. Cutter 200 is supported on bearing pin 100 by a combination of roller bearings 410, 420 and thrust absorbing means 130, 230, 530, 540. A plurality of outer roller bearings 410 run in a race defined by recesses 112, 212 in bearing pin 100 and cutter 200, respectively. A plurality of inner roller bearings 420 run in a race defined by recesses 122, 222 in bearing pin 100 and cutter 200 respectively. Outer and inner roller bearings 410, 420 bear the lateral or radial loads transmitted from bearing pin 100 to cutter 200.

A single thrust button 530 is implanted in the inner or lower end of bearing pin 100, while a matching thrust button 540 is implanted in the center of the inner bore or cavity of cutter 200. Thrust bearing shoulders 130, 230, and thrust buttons 530, 540 bear the axial loads applied to cutter 200 by bearing pin 100. The buttons are preferrably made of tungsten carbide or other wear resistant material.

Cutter 200 is held in place on bearing pin 100 against downward loads tending to move the roller cutter off the pins by a plurality of ball bearings 430 running in a race defined by grooves 140, 240 in bearing pin 100 and cutter 200. Ball bearings 430 are fed into the aforementioned race via a ball filling passage through bearing pin 100, after cutter 200 is positioned on bearing pin 100. The passage is then closed by a so-called ball plug as is old and well known in the industry.

It can be seen from FIG. 2 that, in the prior art, for a given length of outer roller bearings 410, the available length for inner roller bearings 420 is limited by the presence of ball bearings 430 and thrust bearing shoulders 130, 230. As explained before, a limitation on the length of inner roller bearings 420 can impose a load limit on the drill bit or cause premature failure of the bit.

The device of the present invention, as shown in FIG. 3, alleviates this problem by allowing use of longer inner roller bearings 425. Axial thrust is born entirely by a single thrust button 530 in the inner end of bearing pin 100 and a matching thrust button 540 in the center of the inner cavity of cutter 200. There are no additional thrust bearing shoulders as found in the prior art. Since the thrust bearing shoulders, found in the prior art, have been eliminated, it has become possible to alter the structure of bearing pin 100 to eliminate any shoulder (130 in FIG. 2) between outermost journal or section 110 and innermost journal or section 120. In the place of the eliminated shoulder, the device of the present invention has an undercut portion 135 which extends upwardly toward, but which is positioned radially inwardly of, outermost journal or section 110 behind ball bearing groove 140. Undercutting into outermost journal or section 110 allows an increase in the length of the inner roller bearing race defined by journal race surface 127 in innermost journal 125 of bearing pin 100.

Increasing the length of the inner roller bearing race enables the use of longer inner roller bearings 425, resulting in greater load carrying capacity. Since longer roller bearings 425 are used, the inner cavity of cutter 200 is modified to provide an extension lip 228 on inner diameter 225 so that cavity race surface 227 will align with journal race surface 127. Similarly, outer surface 235 on inner diameter 225 of the cutter bore generally follows the contour of undercut 135.

The additional roller bearing length available according to the present invention varies according to the positioning and depth of ball bearing groove 140 since sufficient bearing pin structure must be left behind groove 140 to prevent breakout. In the same way, the exact contour of undercut 135 is determined so as to leave sufficient structure intact. In most applications, however, it is anticipated that sufficient room will be available for undercut 135 to facilitate use of inner roller bearings up to fifty percent (50%) longer than the inner roller bearings used in a bit constructed according to the prior art.

The drawings and description in this application are for purposes of illustrating the invention. It is anticipated that one skilled in the art will be able to devise variations upon the invention as illustrated. All such variations are intended to be encompassed by the following claims.

I claim:

1. An earth boring bit comprising:
    a body having a depending bearing pin having a cylindrical outer section joined to a cylindrical inner section of lesser diameter than the outer section and defining a bearing pin shoulder at the inner end of the outer section;
    a cutter having a bore therein substantially conforming to the bearing pin and spaced therefrom by roller bearing means;
    a roller bearing journal race formed on the inner cylindrical section of the bearing pin; and
    a roller bearing cutter bore race formed in the cutter bore, which substantially aligns with the journal race for receiving the roller bearings between the races;
    wherein the outer edge of the journal race is undercut into the shoulder at the inner end of the outer section of the bearing pin so as to form an overhanging portion of the outer section positioned radially outwardly, with respect to the bearing pin axis, from the inner cylindrical section of the bearing pin.

2. The earth boring bit as claimed in claim 1, wherein the cutter bore race has at least one extended lip extending into the undercut portion in the bearing pin.

3. The earth boring bit as claimed in claim 2, wherein the journal race and the cutter bore race have substantially equal lengths.

4. The earth boring bit as claimed in claim 1, wherein the edge of the journal race is undercut into the bearing pin shoulder at the junction of the inner and outer sections of the bearing pin.

5. An earth boring bit comprising:
    a body having a depending bearing pin having a cylindrical outer section joined to a cylindrical inner section of lesser diameter than the outer section and defining a bearing pin shoulder at the inner end of the outer section;
    a cutter having a bore therein substantially conforming to the bearing pin and spaced therefrom by roller bearing means;
    a roller bearing journal race formed on the inner cylindrical section of the bearing pin; and
    a roller bearing cutter bore race formed in the cutter bore, which substantially aligns with the journal race for receiving the roller bearings between the races;
    wherein the outer edge of the journal race is undercut into the shoulder at the inner end of the outer section of the bearing pin so as to form an overhanging portion of the outer section positioned radially outwardly, with respect to the bearing pin axis, from the inner cylindrical section of the bearing pin; and
    a first thrust button on the inner end of the bearing pin and a second thrust button in the bore of the cutter, in alignment with the first thrust button, for bearing the entire axial load on the bearing pin;
    wherein the bit is free of thrust buttons installed on the bearing pin shoulder and in the bore of the cutter on a surface aligning with the bearing pin shoulder.

* * * * *